United States Patent
Meisels et al.

(10) Patent No.: US 8,898,251 B2
(45) Date of Patent: Nov. 25, 2014

(54) CLIENT CALCULATION OF LINKS TO NETWORK LOCATIONS OF FILES TO UPLOAD

(75) Inventors: Joshua Adam Meisels, Seattle, WA (US); Daniel Paul Costenaro, Bellevue, WA (US); Christian A. Bellofatto, Cambridge, MA (US); Kartik S. Murthy, Seattle, WA (US); Emily Elizabeth Fifer, Boston, MA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/099,842

(22) Filed: May 3, 2011

(65) Prior Publication Data

US 2012/0284357 A1 Nov. 8, 2012

(51) Int. Cl.
*G06F 15/16* (2006.01)
*H04L 29/08* (2006.01)

(52) U.S. Cl.
CPC ............. *H04L 67/06* (2013.01); *H04L 67/1097* (2013.01); *H04L 67/2852* (2013.01)
USPC ........................................................ 709/217

(58) Field of Classification Search
CPC ..... H04L 67/02; H04L 67/06; H04L 67/1097; G06F 17/30861; G06F 17/3089
USPC ........................................................ 709/217
See application file for complete search history.

(56) References Cited

U.S. PATENT DOCUMENTS

| | | | |
|---|---|---|---|
| 6,269,371 B1 | 7/2001 | Ohnishi | 1/1 |
| 6,791,582 B2 * | 9/2004 | Linsey et al. | 715/751 |
| 6,856,989 B1 * | 2/2005 | Zhou et al. | 1/1 |
| 6,910,049 B2 * | 6/2005 | Fenton et al. | |
| 7,272,782 B2 | 9/2007 | Sneh | 715/205 |
| 7,389,241 B1 * | 6/2008 | Bascom | 705/35 |
| 7,542,943 B2 * | 6/2009 | Caplan et al. | 705/40 |
| 7,594,003 B2 | 9/2009 | Davidson et al. | 709/219 |
| 7,680,941 B2 | 3/2010 | Bloch et al. | 709/227 |
| 7,702,521 B2 * | 4/2010 | Bascom | 705/1.1 |
| 7,739,327 B2 * | 6/2010 | Mutton et al. | 709/203 |
| 7,814,234 B2 | 10/2010 | Hawkins et al. | 709/250 |
| 7,908,602 B2 * | 3/2011 | Alcorn et al. | 717/174 |
| 8,064,080 B2 * | 11/2011 | Kawai | 358/1.15 |
| 2007/0033588 A1 * | 2/2007 | Landsman | 717/178 |
| 2007/0255617 A1 | 11/2007 | Maurone et al. | 705/14.73 |
| 2008/0147671 A1 | 6/2008 | Simon et al. | 1/1 |

* cited by examiner

*Primary Examiner* — Kristie Shingles
(74) *Attorney, Agent, or Firm* — Tom Wong; Jim Ross; Micky Minhas (57) ABSTRACT

A link to a file to be stored at a network location is calculated using a client before the file is uploaded to the network location. The client may calculate the link to the network location either while online or offline. In response to determining to upload a file, a link to the file at the network location is calculated before uploading the file. The created link may be a direct link that specifies the file at the network location as the destination of the link and/or a redirect link that when used redirects the user to the file at the network location. The link may be created using various information (e.g. a default location, filename, and/or a unique key). When online, the client may reserve a specific link with the network location before the file is uploaded.

17 Claims, 5 Drawing Sheets

CLIENT CALCULATION OF LINKS TO NETWORK LOCATIONS OF FILES TO UPLOAD

BACKGROUND

Users upload files to network locations for various reasons. For example, a user may upload a file to a network location for collaboration with other users. After a file is uploaded to a network location, a link to the file may be provided to access the uploaded file.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A link to a file to be stored at a network location is calculated using a client before the file is uploaded to the network location. The client may calculate the link to the network location either while online or offline. For example, the link to the file at the network location may be calculated using the client at a time when the client is offline and determines to upload the file. In response to determining to upload a file, a link to the file at the network location is calculated before uploading the file. The created link may be a direct link that specifies the file at the network location as the destination of the link and/or a redirect link that when used redirects the user to the file at the network location. The link may be created using various information (e.g. a default location, filename, and/or a unique key). When online, the client may reserve a specific link with the network location before the file is uploaded.

DETAILED DESCRIPTION

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Figure 1:
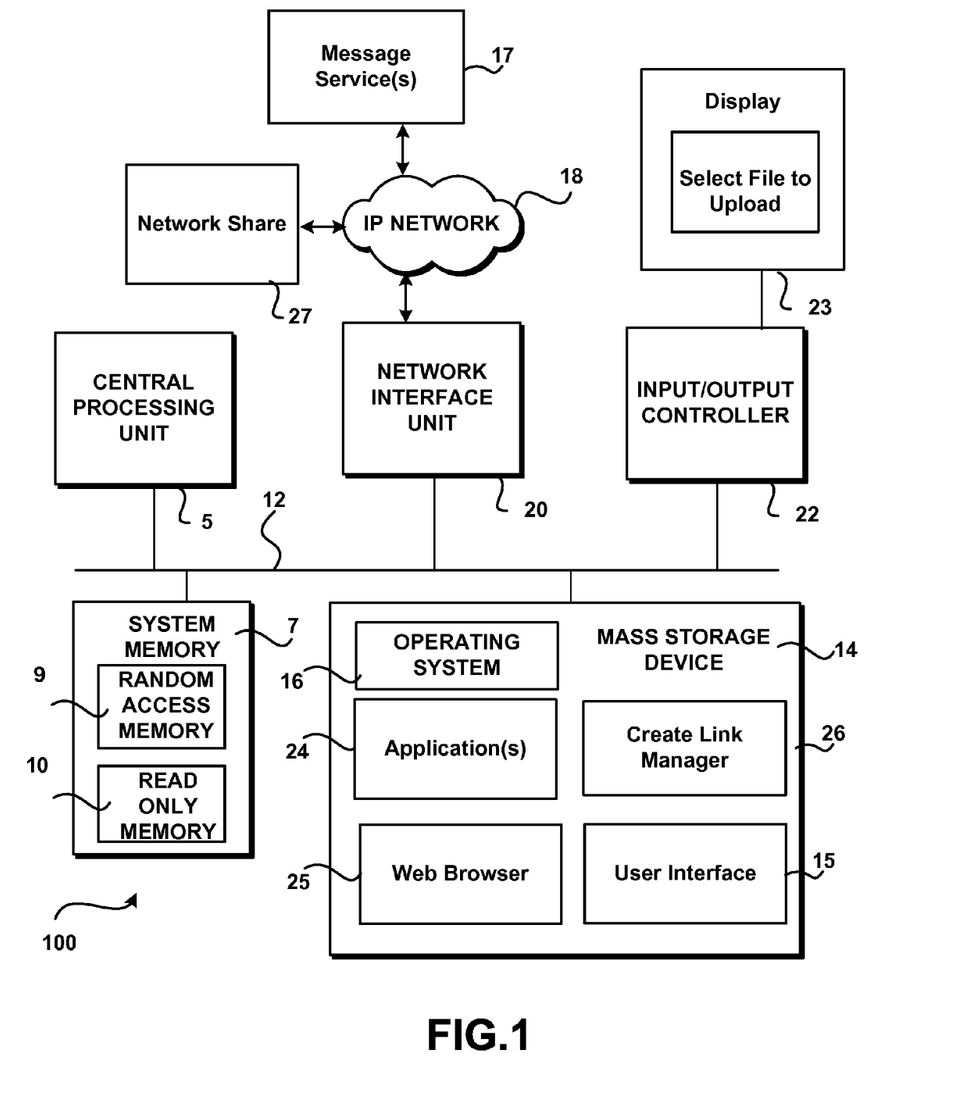
FIG. 1 illustrates an exemplary computing environment.

Referring now to FIG. 1, an illustrative computer environment for a computer 100 utilized in the various embodiments will be described. The computer environment shown in FIG. 1 includes computing devices that each may be configured as a mobile computing device (e.g. phone, tablet, net book, laptop), server, a desktop, or some other type of computing device and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 100 further includes a mass storage device 14 for storing an operating system 16, messaging application(s) 24, Web Browser 25, and create link manager 26 which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

Computer 100 operates in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, or electronic stylus (not shown in FIG. 1). Similarly, an input/output controller 22 may provide input/output to a display screen 23, a printer, or other type of output device.

As mentioned briefly above, a number of program modules and data files may be stored in the mass storage device 14 and RAM 9 of the computer 100, including an operating system 16 suitable for controlling the operation of a computer, such as the WINDOWS PHONE 7®, WINDOWS 7®, or WINDOWS SERVER® operating system from MICROSOFT CORPORATION of Redmond, Wash. The mass storage device 14 and RAM 9 may also store one or more program modules. In particular, the mass storage device 14 and the RAM 9 may store one or more application programs 34, such as one or more messaging applications, document editing applications (e.g. word processor, spreadsheet, presentation, drawing . . . ) and Web browser 25. For example, computer 100 may include an email application, an Instant Messaging (IM) application, an SMS, MMS application, a real-time information network application, a social networking application, and the like. According to an embodiment, computer 100 includes an email application, such as MICROSOFT OUTLOOK®. The application(s) may be client based and/or web based. For example, a network based message service 17 may be used, such as: MICROSOFT WINDOWS LIVE or some other network based email and messaging service; a document network service; a file sharing service; and the like.

A user interface 15 is used by a user to interact with applications and files. For example, user interface 15 may be used to select a file to upload to a network location, such as network share 27.

Network share 27 is configured to store content (e.g. documents, spreadsheet, Web content, and the like) that are accessible to one or more users through IP network 18. For example, network share 27 may store content that is accessible by users located at one or more locations.

Create link manager 26 is configured to create a link for a file that is to be uploaded to a network location. The term "link" refers to an address that represents a location of content. For example, a link may be in the form of a Uniform Resource Locator (URL) that specifies a network location of where the attachment/content is stored. Clicking the link generally retrieves the content that is pointed to by the link. Create link manager 26 may be located externally from an application, e.g. application 24, as shown or may be a part of an application. Further, all/some of the functionality provided by create link manager 26 may be located internally/externally from an application.

Create link manager 26 calculates a link to a file to be stored at a network location (e.g. network share 27 or some other network location) before the file is uploaded to the network location. Computer 100 may calculate the link either while online with the network location or while offline. For example, computer 100 may be offline when a user determines to upload a file to network share 27. In response to determining to upload a file, create link manager 26 calculates a link to the file at the network location before uploading the file. The created link may be a direct link that specifies the file at the network location as the destination of the link and/or a redirect link that when used redirects the user to the file at the network location. The link may be created using various information (e.g. a default location, filename, and/or a unique key). When online, the client may reserve a specific link with the network location before the file is uploaded. More details regarding create link manager 26 are described below.

Figure 2:
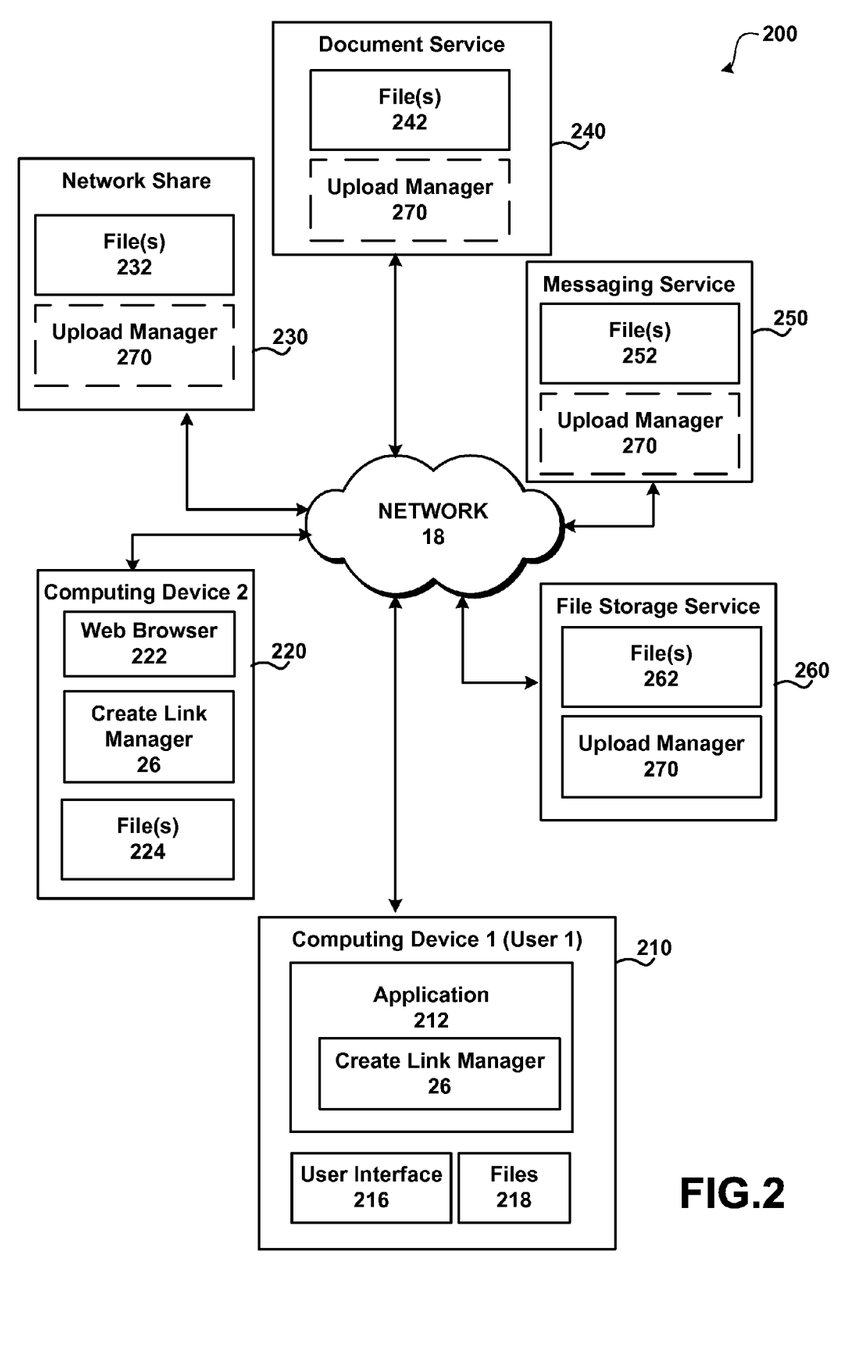
FIG. 2 shows a system for creating links to files that are to be uploaded to a network location using a computing device that is at a different network location from where the file is to be uploaded.

FIG. 2 shows a system for creating links to files that are to be uploaded to a network location using a computing device that is at a different network location from where the file is to be uploaded. As illustrated, system 200 includes computing device 1 (210), computing device 2 (220), network share 230, document service 240, messaging service 250 and file storage service 260.

The computing devices may be any type of computing device that is configured to perform the operations relating to using links created on a first computing device to access files on one or more second computing devices and/or storing files that may be accessed through one or more links. For example, some of the computing devices may be: mobile computing devices (e.g. cellular phones, tablets, smart phones, laptops, and the like); desktop computing devices and servers. Some computing devices may be arranged to provide an online service (e.g. document service 240, messaging service 250, file storage service 260), some may be arranged as data shares, some may be arranged in local networks, some may be arranged in networks accessible through the Internet, and the like.

The computing devices are coupled through network 18. Network 18 may be many different types of networks. For example, network 18 may be an IP network, a carrier network for cellular communications, and the like. Generally, network 18 is used to transmit data between computing devices, such as computing device 1, computing device 2, network share 230, document service 240, messaging service 250 and file storage service 260.

Computing device 1 includes application 212, user interface 216 and files 281. As illustrated, computing device 1 is used to calculate links for one or more files to be uploaded to a network location (e.g. files 218). According to an embodiment, application 212 is a messaging application, such as MICROSOFT OUTLOOK. Application 212 may be many different types of applications that may be used to select/determine a file to upload to a network location (e.g. network share 230, document service 240, messaging service 250, file storage service 260). For example, application 212 may be a word processing application, a file sharing application, a video sharing application, a picture sharing application, a spreadsheet application, and the like.

User interface (UI) 216 is used to interact with an application and content, such as application 212 and files(s) 232, 242, 252, and 262 One or more user interfaces of one or more types may be used to interact with the content. For example, UI 216 may include the use of a context menu, a menu within a menu bar, a menu item selected from a ribbon user interface, a graphical menu, and the like. Generally, UI 216 is configured such that a user may easily interact with one or more applications and select one or more files for uploading to a network location. For example, a user may simply select an option within UI 216 to select a file to upload to a network location. UI 216 may also be used to set permissions that are used for the file at the network location and to access the file and/or to use the link to the file.

Application 212 may be a client based application, such as an email application, a word processing application, a video application, a picture application, a collaboration application (e.g. MICROSOFT SHAREPOINT), an Instant Messaging Application, a social media application, and the like. Generally, application 212 is used to select one or more files to upload to a network location. According to an embodiment, application 212 is an electronic messaging application that is used to send and receive electronic messages of one or more types. For example, application 212 may be used to select a file to upload to file storage service 260. In response to selecting a file to upload, create link manager 26 calculates a link to the file that may be used to access the file once the file is uploaded to the file storage service. The link may be placed within a message that is sent to one or more recipients to indicate that a file will be available for sharing after uploading. A web interface may be used to one or more online services and/or network shares (e.g. network share 230, document service 240, messaging service 250 and file storage service 250.

Computing device 2 includes create link manager 26, files 224 and one or more applications, such as a web browser (222) that may be configured to access a messaging service, such as a web based email service and to interact with content. For example, a web browser may be used to access messaging service 240 and create an electronic message including one or more files. Computing device 2 may be configured with a create link manager 26 to locally create a link for a file that is to be uploaded to a network location.

One or more network shares (e.g. network share 230) may be used to store content, such as one or more files 232. The content may be any type of content that is linked/attached within a message, such as word processing documents, spreadsheets, slides, pictures, videos, website content and the like Network share 230 is accessible by the computing devices that interact with the content. The network share may be associated with an online service that supports online access/interaction with content. The network share(s) may be associated with one or more online services. For example, one or more of the online services may access one or more network shares to access a file. Different network shares may be associated with different types of files (e.g. a network share for a video service, picture service, document service, and the like.). A user may designate one or more network shares and/or file storage service as a designated network location. According to an embodiment, when a file is selected to be uploaded, the file is uploaded to one or more of the designated network locations. For example, a file may be uploaded to a designated network location of a first recipient and a different designated network location of a second recipient.

Document service 240 includes documents 242. According to an embodiment, document service 240 is configured as an online service that is configured to provide services relating to displaying an interacting with electronic documents, such as word processing document, spreadsheets, slides and the like. Document service 240 is configured for receiving and responding to requests relating to documents. For example, document service 240 may access documents 242. Document service 240 may also be configured to access files on a different network share and/or online service. Document service 240 receives requests from computing devices, such as computing devices 1 and 2. A computing device may transmit a request to document service 240 to interact with a document, such as a collaborated document that is being reviewed/edited by more than one author/reviewer. In response to such a request, document service 240 obtains the document from a location, such as network share 230. The document to display is converted into a markup language format, such as the ISO/IEC 29500 format. The document may be converted by document service 240 or by one or more other computing devices. Once the markup language representation of the document has bee obtained, the document service converts the markup language formatted document into a representation of the document that may be rendered by a Web browser application, such as Web browser 222 on computing device 2. The rendered document appears substantially similar to the output of a client based application. Once the file has been rendered it is returned by the document service 240 to the requesting computing device where it may be rendered by the Web browser 222.

Messaging service 250 may be used to process electronic messages between one or more computing devices, such as computing device 1 and computing device 2. Messaging service 250 may be configured to process different message types, such as SMS, MMS, email, messages for social networks and the like.

File storage service 260 is an online file storage service (e.g. MICROSOFT LIVE SKYDRIVE) including an upload manager 270 that may be used to store files 262 at a networked location. The online storage service may be configured to store one or more types of files (e.g. documents, photos, videos, and other types of content). Permissions may be set for the files that are stored using the file storage service 260 such that one or more users may share files. According to an embodiment, file storage service 260 is configured to receive a link that is calculated by create link manager 26 and to store the file at the location indicated by the link. When the link that is received is a direct link, the upload manager of the file storage service stores the file at the address of the link. When the link that is received is a redirect link, the upload manager of the file storage service may determine a location of where to store the file and associate the redirect link with the actual location of the file. The association may be stored different ways. For example, a table may be used that associates the redirect link obtained from the create link manager with the direct link to the file. Upload manager 270 may also be configured to receive requests from create link manager 26 that relate to storing files that are uploaded. According to an embodiment, upload manager 270 is configured to receive a reservation request from create link manager 26 that requests a specific link to be reserved for a file. For example, computing device 1 may send a reservation request to file storage service 260 requesting that link "http://filestorageservice/User1/file1.doc" be reserved for the storage of the file "file1.doc" when it is uploaded to the file storage service. The reservation for the link may be valid for a period of time. For example, the reservation for the link may be held for a predetermined period of time (e.g. five minutes, ten minutes, thirty minutes, one hour, 1 day . . . ) and when the time period expires the reservation is released and is no longer reserved. Upload manager 270 may also be configured to provide the create link manager with a verification that a calculated link is available. For example, while online, computing device 1 may send a confirmation request to file storage service 260 as to whether link1 is available. When link1 is available, link1 may be used to upload the file. When link1 is not available, the create link manager 26 may calculate a different link.

Upload manager 270 may also be configured to provide a computing device (e.g. computing device 1) with a set of links and/or unique keys that may be used by the computing device to determine the links for files that are to be uploaded to the network location. The provided links/unique keys to a computing device may be refreshed when the computing device connects to the upload manager. For example, assume that ten links have been received from file storage service 260 and cached at computing device 1. Since last being online with file storage service 260 computing device has used two of the links/unique keys. When computing device goes online with file storage service 260, the upload manager provides two additional links to the computing device to replenish the used links. As discussed, the upload manager may be configured to provide a set of unique keys to a computing device that may be used in creating a link. The unique keys may be used by the create link manager at the computing device in different ways. For example, a unique key may be added to a link to help ensure that a unique link is calculated by the create link manager.

Create link manager 26 is configured to determine when a file has been requested to be uploaded to a network location, such as network share 230, document service 240, messaging service 250 and/or file storage service 260. The files may be any type of content, such as word processing documents, spreadsheets, slides, pictures, videos, website content and the like. According to an embodiment, a link is calculated for each file that is to be uploaded to a network location. According to an embodiment, the link(s) are placed within an electronic message that is delivered to one or more recipients to provide the recipients with a way to access the file when it is uploaded. A single link may also be used to address all of the files that were uploaded to the shared location (e.g. the link may point to a folder containing the uploaded files). The files may be uploaded before the message is sent and/or after the message is sent. The link(s) to the files are created before the files are uploaded.

Create link manager 26 is configured to automatically permission the uploaded files at the network share(s). The permissions for each of the files/recipients may be set the same/differently. For example, read/write permissions may be set for each of the recipients of the message. The permissions may also be set on other security criteria. For example, create link manager 26 may be configured to restrict access to a file when a recipient of a message is outside of a security group (e.g. the recipient is not a part of the same organization/group/team as the sender). Different permissions may be set. For example, a recipient outside of a trusted security group may be restricted from accessing the file, the recipient may have read permissions but not write permissions, and the like. Recipients in different groups may have different permissions to the files. Senders may also be restricted from sending/forwarding a message to a recipient that is determined to be unauthorized. The security settings may be set by a user (e.g. an administrator).

One or more network shares and/or online services 270 may be configured with the functionality of upload manager 270. An upload manager may be associated with more than one network share and/or online service. For example, a single upload manager may manage uploads for network share 230 and messaging service 250.

Figure 3:
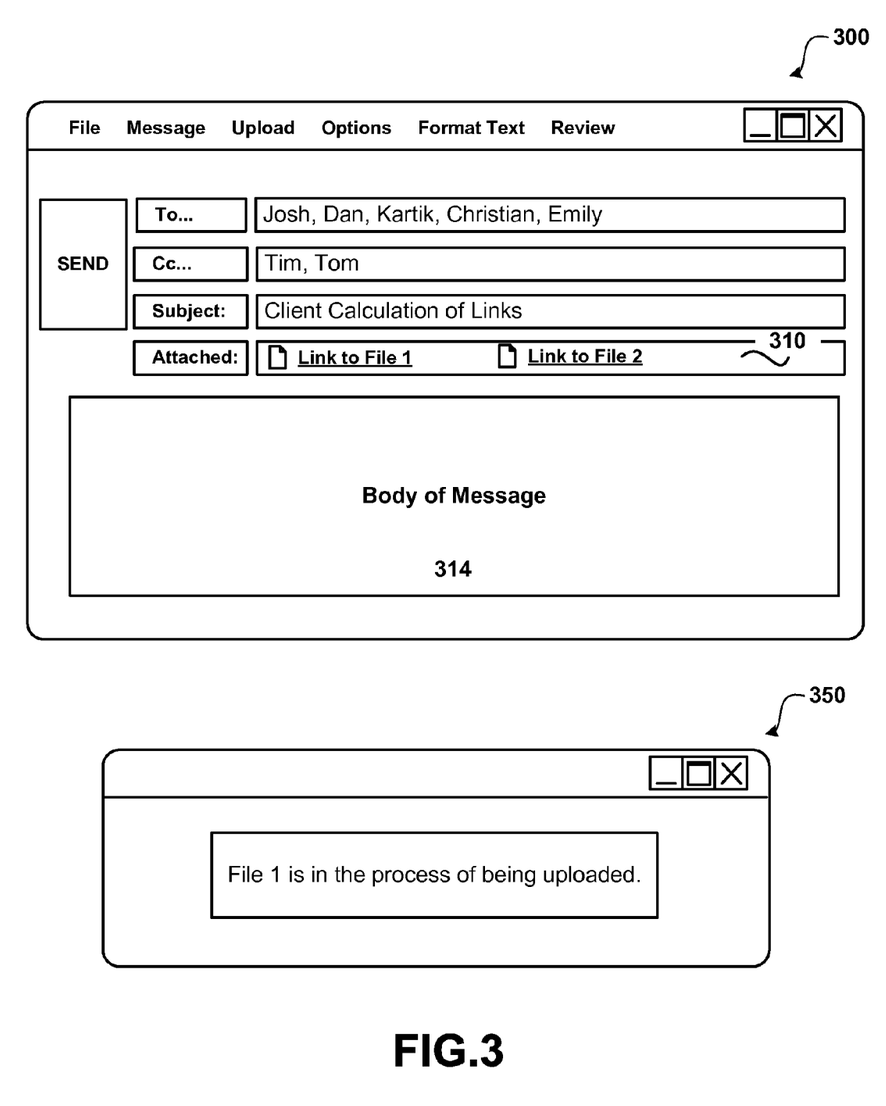
FIG. 3 shows displays of an electronic message after two files have been selected to be uploaded and links have been calculated to a network location.

FIG. 3 shows displays of an electronic message after two files have been selected to be uploaded and links have been calculated to a network location. As illustrated, message 300 comprises a To: field, a Cc: field, a Subject field: an Attached field; and body of the message 314. More or fewer fields may be included with the electronic message.

The electronic message may be created/accessed a number of ways. For example, a web browser may access an electronic mail service, an email application on a computing device may be configured to send/receive emails from one or more different services, and the like.

When the electronic message is created, one or more files (e.g. File 1 and File 2) may be designated to be uploaded to a shared location and shared with the recipients. The files may be any type of content, such as pictures, videos, word processing documents, spreadsheets, slides, websites and the like. Generally, the file may be to any type of content that is accessible by a computing device.

Message 300 shows a view after the links to the files that are designated to be uploaded have been created (Link to File 1 and Link to File 2 (310)). According to an embodiment, the link to the files to upload are located within an attachment area of the message such that the user does not have to search for the linked content within the body of the electronic message.

The attachment area may be located within many different areas of the display. Generally, the attachment area is located such that the display of the attached area remains visible even though the body of the message is scrolled to change the view of the message. A graphical indicator, such as an icon, may be displayed within the attachment area near the link to provide additional information relating to the attachment. The graphical indicator may be selected to indicate a type of the content and/or other characteristics relating to the linked content. For example, a document icon may be used to show the content is a document, a web icon may be used for web content, a spreadsheet icon may be used for spreadsheets, a picture icon may be used for pictures, a message icon may be used for messages, an online service icon may be used to show where the file has been uploaded (e.g. a video service icon to indicate that the file has been uploaded to video service 1, a picture service icon . . . ) and the like.

According to an embodiment, the permissions for file 1 and file 2 are automatically set such that each recipient has access to the file at the network location (e.g. read/write permissions). When a recipient receives message 300, they may use one of the links before the file has been uploaded to the network location. According to an embodiment, when a recipient selects a link to a file (e.g. Link to File 1) that has not been uploaded to the network location, a message (e.g. message 350) is provided to the recipient.

Figure 4:
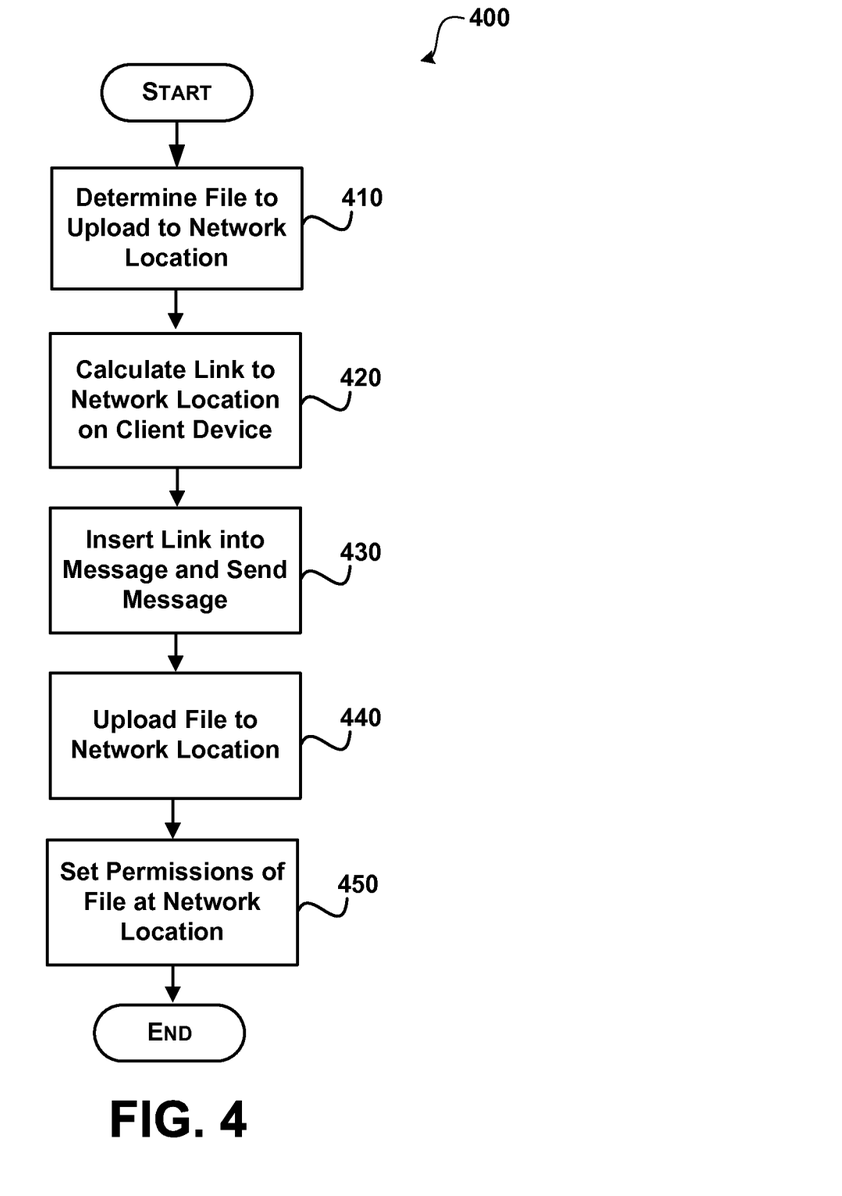
FIG. 4 illustrates a process for calculating a link to a file to be uploaded to a network location.
Figure 5:
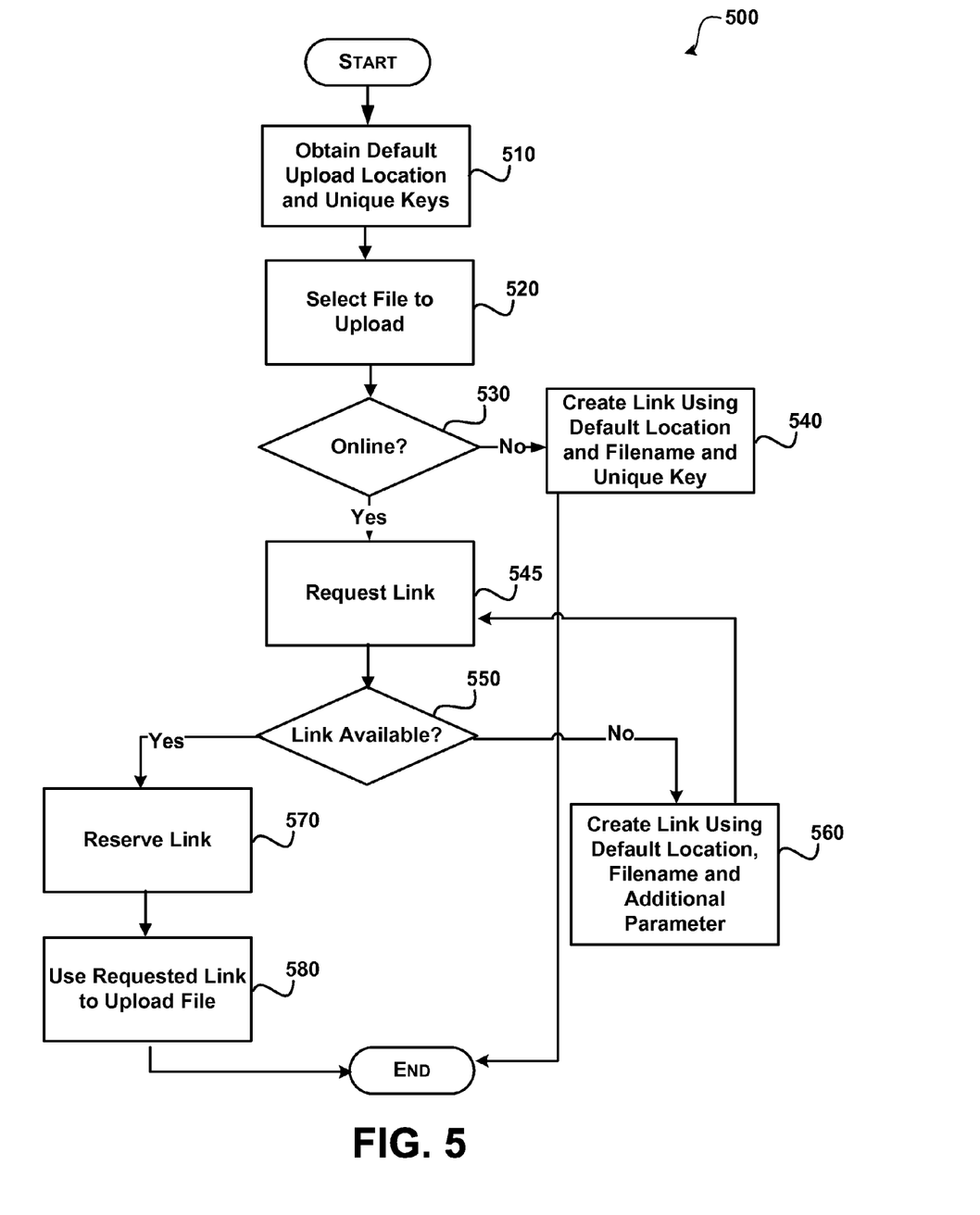
FIG. 5 shows a process for creating a link while offline and while online before uploading a file to a network location.

FIGS. 4 and 5 shows an illustrative process for creating a link to a file before the file is uploaded to a network location. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

FIG. 4 illustrates a process for calculating a link to a file to be uploaded to a network location.

After a start block, process 400 moves to operation 410, where a determination is made to upload a file to a network location. The determination may be made from one or more applications (e.g. messaging application, word processing application, web based service, and the like). For example, a file may be selected from a graphical user interface of an application to upload. When the file is selected for upload other options may also be obtained from the user (e.g. permissions, network location(s) of where to upload the file, and recipients to receive a sharing message).

Flowing to operation 420, a link is calculated before the file is uploaded to the network location. According to an embodiment, the link is created local to the computing device where the file was selected to be uploaded. The computing device creating the link may/may not be connected to the network location. For example, the file selected to be uploaded may be received on a computing device that is offline from a file storage service where the file is to be uploaded. The created link may be a direct link that specifies the file at the network location as the destination of the link and/or a redirect link that when used redirects the user to the file at the network location. The link may be created using various information (e.g. a default location, filename, and/or a unique key) (See FIG. 5 and related discussion).

Moving to operation 430, the calculated link is inserted into an electronic message and the message is sent to one or more recipients. The electronic message may be any electronic message that includes the ability to include a link. According to an embodiment, the electronic messages are email messages. Other messages may also be used, such as SMS, MMS, Instant Messages, social network messages, and the like.

Transitioning to operation 440, the file is uploaded to one or more network locations. The attachments may be uploaded to shared locations based on different criteria. For example, a network location may be selected based on a type of the attachment (e.g. video attachments to a network location that hosts videos, picture attachments to a network location that hosts pictures, documents to a network location that hosts documents, and the like.) A network location may also be selected based on shared locations that are chosen by the selector of the file and/or one or more of the recipients. For example, each recipient may have configured preferences indicating a desired network location. The file may be uploaded to more than one network location (e.g. the attachment is uploaded to each recipient's configured network location). When the link calculated at operation 420 is a direct link, the file is uploaded to the address of the link. When the link calculated is a redirect link, the file may be placed in different locations that are managed by the network location. For example, the file may be uploaded to a default location of the network location. The network location may move the file to another location and associate the redirect link with the address of the actual location of the uploaded.

Transitioning to operation 450, permissions for accessing the uploaded file are set. According to an embodiment, each file is set to read/write permission for each recipient of the message containing the link to the file. The permissions may be set according to other criteria (e.g. the permissions may be set based on a security policy of an organization). For example, the security policy may set restrictions on accessing an attachment for a recipient that is not within the sender's organization (e.g. the sender includes a recipient that is located outside of the company). According to an embodiment, the security policy is predetermined such that permissions are set automatically without user interaction.

The process then flows to an end block and returns to processing other actions.

FIG. 5 shows a process for creating a link while offline and while online before uploading a file to a network location.

After a start block, process 500 moves to operation 510, where a default upload location and unique keys are obtained from a network location where the file is to be uploaded. The default upload location for a network location may be obtained directly from the network location and/or from a preference. For example, each network location may have a predetermined location where to place uploaded files based on a user (e.g. //networklocation1/username/shared). The format of the link may change based on the implementation. A set of unique keys may be provided by the network location that may be used in calculating the link. The unique keys help to ensure that links that are created are unique to each user and to each file that is uploaded. The set of unique keys may contain a predetermined number of keys (e.g. 10, 100, 1000). According to an embodiment, the set of unique keys that are maintained by a client are replenished each time the user connects to the network location. For example, a user may have used one of the unique keys in calculating a link since that user last connected to the network location. In this case, the network service may provide a replacement key when the client reconnects to the network location. A client may also be configured to request one or more unique keys from the network location.

Moving to operation 520, the file to upload is selected. The file may be selected using one or more applications. For example, the file to upload may be selected from a messaging application, a picture application, a video application, a word processing application, and the like.

Flowing to decision operation 530, a determination is made as to whether the client is online with the network location to where the file is to be uploaded or whether the client is offline. When the client is not online with the network location, the process moves to operation 540. When the client is online with the network location, the process moves to operation 545.

At operation 540, the link is calculated. According to an embodiment, the link is calculated using a combination of the default location and filename (or partial filename) and one of the unique keys. For example, the links may take the form: http://networklocation1/username/shared/ untitledQA7K9X.docx; http://networklocation1/username/shared/?key=QA7K9X; http://networklocation1/username/shared/?key=QA7K9X&name=untitled.docx where QA7K9X is one of the unique keys.

At operation 545, when the client is online with the network location, a link is requested to be reserved from the network location. According to an embodiment, the link requested includes the default location and the filename.

At decision operation 550, a determination is made as to whether the requested link is available at the network location. When the link is available, the process flows to operation 570. When the link is not available the process flows to operation 560.

At operation 560, when the link is not available, the link is created using an additional parameter. For example, a number may be appended to the end of the link (e.g. start with a number and then increment the number until a link is available). A unique key may also be used. Generally, any parameter that changes the link may be attempted to be used. After changing the link, the process returns to operation 545.

At operation 570, the link is reserved such that it is available when the file is uploaded after the creation of the link. The link may be reserved for a period of time and after the period of time expires the reserved link may be released.

Moving to operation 580, the requested link is used to upload the file to the network location.

The process then flows to an end block and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for using a client based application comprising:
   identifying a file to be uploaded to a location associated with a file storage service;
   calculating a link associated with the file before the file is uploaded to the location associated with a file storage service, the link being calculated when the client based application is not connected to the file storage service, wherein calculating the link is based on at least one of a default upload location, a location associated with a preference, a location based on a user, and a location associated with a unique key;
   inserting the calculated link into an electronic message; and
   uploading the file to the location when the client based application is connected to the file storage service.

2. The method of claim 1, further comprising creating a redirect link to the file before uploading the file to a network location.

3. The method of claim 1, further comprising alculating obtaining the link from a set of reserved links obtained while the client based application is connected to the file storage service.

4. The method of claim 1, further comprising creating a Uniform Resource Locator (URL) on a client device to a desired network location.

5. The method of claim 4, further comprising sending a request to the desired network location to reserve the desired network location for a period of time.

6. The method of claim 1, further comprising determining when the link is used before the file is uploaded to a network location and providing a message indicating that the file has not yet been uploaded to the network location.

7. The method of claim 1, further comprising uploading the file to a shared space that is accessible by each recipient of the electronic message that includes the link.

8. The method of claim 1, further comprising calculating the link using a unique key that is stored on the client to generate a URL.

9. A computer-readable storage device, storing computer-executable instructions for using a client based application comprising:
    identifying a file to be uploaded to a location associated with a file storage service;
    calculating a link associated with the file before the file is uploaded to the location associated with a file storage service, the link being calculated when the client based application is not connected to the file storage service, wherein calculating the link is based on using a default location when the client based application is online and using the default location and a unique key to calculate the link when the client based application is offline;
    inserting the calculated link into an electronic message; and
    uploading the file to the location when the client based application is connected to the file storage service.

10. The computer-readable storage device of claim 9, wherein calculating the link comprises at least one of: creating a redirect link to the file and obtaining the link from a set of reserved links.

11. The computer-readable storage device of claim 9, further comprising sending a request to a network location to reserve the link for a period of time.

12. The computer-readable storage device of claim 9, further comprising determining when the link is used before the file is uploaded to a network location and providing a message indicating that the file has not yet been uploaded to the network location.

13. The computer-readable storage device of claim 9, further comprising setting permissions for the file at a network location such that each recipient of a message is able to access the file at the network location.

14. The computer-readable storage device of claim 9, further comprising updating a set of unique keys associated with the client based application that are used in calculating the link when the client based application is online.

15. A system configured to use a client based application comprising:
    a network connection that is configured to connect to a network and a file storage service;
    a processor, memory, and a computer-readable storage medium;
    an operating environment stored on the computer-readable storage medium and executing on the processor; and
    a create link manager operating in conjunction with the operating environment that is configured to perform actions comprising:
        identifying a file to be uploaded to a location associated with a file storage service;
        calculating a link associated with the file before the file is uploaded to the location associated with a file storage service, the link being calculated when the client based application is not connected to the file storage service, wherein calculating the link comprises using a default location to calculate the link when the client based application is online and using the default location and a unique key to calculate the link when the client based application is offline, wherein a set of unique keys associated with the client based application from which the unique key is selected are refreshed when the client based application is online;
        inserting the calculated link into an electronic message; and
        uploading the file to the location when the client based application is connected to the file storage service.

16. The system of claim 15, wherein calculating the link comprises at least one of: creating a redirect link to the file and obtaining the link from a set of reserved links.

17. The system of claim 15, further comprising sending a request to a network location to reserve a calculated link for a period of time.

* * * * *